United States Patent
Fisher et al.

(10) Patent No.: US 7,131,662 B2
(45) Date of Patent: Nov. 7, 2006

(54) AIRBAG WITH TEAR SEAM SENSOR AND DEPLOYMENT RATE SENSOR

(75) Inventors: John Fisher, Tampa, FL (US); Robert P. Pettypiece, Jr., Lakeland, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 251 days.

(21) Appl. No.: 10/911,654

(22) Filed: Aug. 5, 2004

(65) Prior Publication Data

US 2006/0028006 A1 Feb. 9, 2006

(51) Int. Cl.
*B60R 21/16* (2006.01)

(52) U.S. Cl. ............. 280/735; 280/728.3; 280/739; 280/743.2

(58) Field of Classification Search .......... 280/735, 280/728.3, 739, 743.2
See application file for complete search history.

(56) References Cited

U.S. PATENT DOCUMENTS

| | | | |
|---|---|---|---|
| 5,762,367 A | 6/1998 | Wolanin | |
| 5,887,894 A | 3/1999 | Castagner et al. | |
| 5,899,488 A | 5/1999 | Müller | |
| 6,135,494 A | 10/2000 | Lotito et al. | |
| 6,219,605 B1 | 4/2001 | Bauer et al. | |
| 6,259,364 B1 | 7/2001 | Sowers et al. | |
| 6,301,535 B1 | 10/2001 | Nusholtz | |
| 6,308,983 B1 | 10/2001 | Sinnhuber | |
| 6,517,108 B1* | 2/2003 | Vinton et al. ............... 280/739 |
| 6,726,240 B1* | 4/2004 | Riha ....................... 280/728.3 |
| 2004/0155445 A1 | 8/2004 | Husby | |
| 2004/0164533 A1 | 8/2004 | Pettypiece, Jr. | |
| 2004/0174156 A1 | 9/2004 | Ilyes et al. | |

FOREIGN PATENT DOCUMENTS

| | | |
|---|---|---|
| EP | 0 812 741 A1 | 3/1997 |
| EP | 0 990 567 A1 | 4/2000 |
| JP | 09-240403 | 3/1996 |
| JP | 09-263206 | 10/1997 |
| JP | 10-119710 | 5/1998 |
| JP | 11-091497 | 4/1999 |
| JP | 2001-158316 | 6/2001 |

* cited by examiner

*Primary Examiner*—Eric Culbreth
(74) *Attorney, Agent, or Firm*—Lonnie Drayer; Patrick Steinnon

(57) ABSTRACT

An airbag assembly employs tape sensors to monitor the rate at which an airbag is deployed. The airbag is part of an airbag module that incorporates a vent that can be actuated if it is determined by logic associated with the airbag that the airbag has prematurely collided with an object. To better determine the dynamics of the airbag deployment, a sensor is positioned across a tear seam in the cover through which the airbag breaks. The sensor provides a direct indicator that the tear seam has opened, which is used as the starting time for monitoring the rate of airbag deployment. The tear seam sensor could also be used in conjunction with any airbag electronics to control a function of an airbag.

24 Claims, 3 Drawing Sheets

AIRBAG WITH TEAR SEAM SENSOR AND DEPLOYMENT RATE SENSOR

FIELD OF THE INVENTION

The present invention relates to airbags that employ sensors to monitor the rate at which the airbag is deploying, and which vent the airbag if the airbag deployment slows prematurely, indicating the presence of an "out of position" vehicle occupant.

BACKGROUND OF THE INVENTION

Airbags that deploy in the event of a vehicle crash are an important part of the overall safety system of an automobile. Airbags in combination with seatbelts and other safety systems reduce death and injury that can occur during a vehicle crash. However, in certain circumstances an airbag can present a hazard to a vehicle occupant if the vehicle occupant is positioned too close to the airbag as the airbag deploys. In such a circumstance the vehicle occupant is described as "out of position." If a vehicle occupant is "out of position" with respect to an airbag, it is better if the airbag does not deploy, or if deployment has begun, that deployment be terminated by venting the airbag. One known approach is to monitor the position of the vehicle occupant using sensors located within the passenger compartment and to use safety system logic to not deploy an airbag in those situations where the vehicle occupant is out of position. This approach has several difficulties: there is a time delay between when the decision to deploy is made and when the actual deployment takes place; and during this time delay the vehicle occupant may have moved closer to the airbag, and may be out of position during actual airbag deployment. Sensors located within the passenger compartment must operate in a crash environment where noise, debris, and electromagnetic interference may make reliable detection of a vehicle occupant's position difficult. Sensors located within the passenger compartment are typically required to be on at all times which consumes power.

Another approach to dealing with the "out of position" problem is to mount a sensor on the inside or outside of the airbag. One type of sensor is mounted inside the airbag and uses tapes sewn to the inside of the airbag, which are drawn out of tape cartridges passing by sensors which monitor the rate at which the airbag deploys by monitoring the rate at which tape is withdrawn from the cartridges. Examples of such systems are disclosed in EP 0990 567, and EP 0 812 741 and commonly owned U.S. patent applications Ser. No. 10/359257 published as 2004/0155445 A, Ser. No. 10/369697 published as 2004/0164533 A, and Ser. No. 10/382538 published as 2004/0174156 A which are incorporated herein by reference. If the rate of tape withdrawal slows down before the airbag has fully deployed, that is an indication that the airbag has collided with an object before full deployment, and the airbag can be vented. In order to obtain a better understanding of airbag deployment dynamics, a means for determining when the airbag deployment into the passenger compartment has begun is needed.

SUMMARY OF THE INVENTION

The airbag of this invention employs tape sensors that monitor the rate at which the airbag is deployed. The airbag is part of an airbag module which incorporates a vent which can be actuated in the event it is determined by the airbag deployment controller via a sensor, or system logic associated with the airbag that the airbag has prematurely collided with an object, which may be an "out of position" vehicle occupant. The rate of tape withdrawal from a plurality of tape dispensers is monitored by sensors. To better determine the dynamics of the airbag deployment, a sensor such as a break wire, foil, or optical fiber is positioned across a tear seam in the cover of the steering wheel, vehicle dashboard, or other structure, through which the airbag breaks. As the airbag deploys it may move a short distance before engaging the tear seam, which offers some resistance to the movement of the airbag into the vehicle. The resistance of the airbag passing through the tear seam must be distinguished from the resistance to forward movement caused by impact with an object, or an "out of position" vehicle occupant. A switch or sensor that is a direct indicator that the tear seam has opened is used as the starting time for monitoring the rate of airbag deployment. This starting time is largely independent of timing variations such as those caused by temperature extremes or the position of the airbag with respect to the tear seam.

It is a feature of the present invention to provide a signal to an airbag deployment controller via a sensor, or system logic that indicates the airbag has begun to deploy into the passenger compartment of a vehicle.

It is another feature of the present invention to provide a timing signal to an airbag deployment controller via a sensor, or system logic that is less sensitive to temperature and geometric variances.

It is a further feature of the present invention to provide an indication of tear seam opening to an electronic logic system that is monitoring airbag deployment and controlling airbag venting.

Further features and advantages of the invention will be apparent from the following detailed description when taken in conjunction with the accompanying drawings.

DETAILED DESCRIPTION OF THE INVENTION

Figure 1:
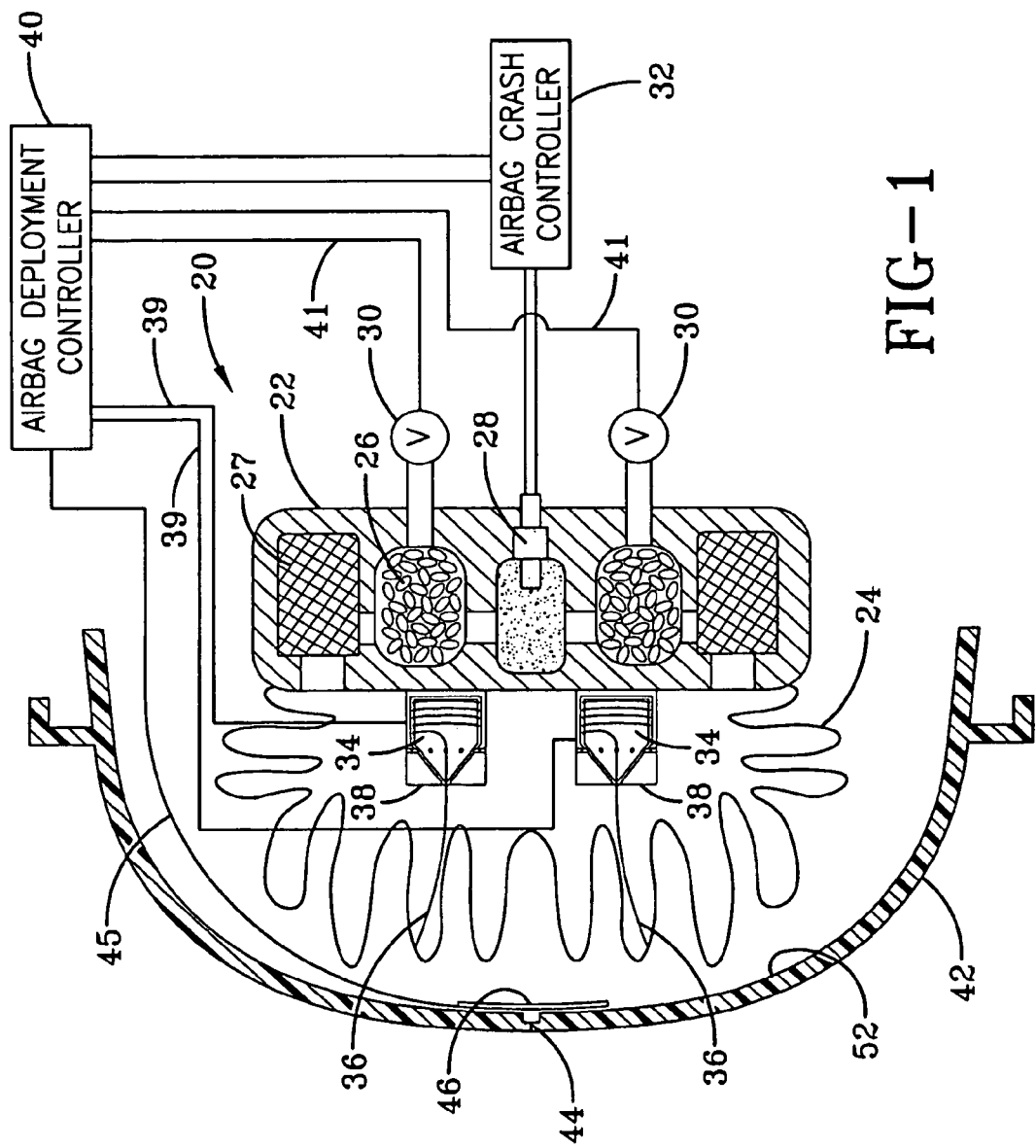
FIG. 1 is a schematic cross-sectional view of the airbag module, airbag cover, and airbag tear seam sensor of this invention.

Referring more particularly to FIGS. 1–4 wherein like numbers refer to similar parts, an airbag module 20 is shown in FIG. 1. The airbag module 20 comprises an inflator module 22 that supplies gas to inflate a airbag 24. The inflator module 22 contains a gas generant 26, a gas filter 27, an igniter 28, and one or more vents 30. The igniter 28 is connected to an airbag crash controller 32. Mounted within the airbag 24 on the inflator module is a plurality of airbag deployment rate sensors 34, which monitor the rate at which strings or tapes 36 which are attached to the inside of the airbag 24, are withdrawn from string or tape cartridges 38. The airbag deployment rate sensors are connected by lines 39 to an airbag deployment controller 40 which is also connected by lines 41 to control the opening of the inflator module vents 30. The airbag module 20 is mounted in a vehicle (not shown) behind an airbag cover 42 in the center of the steering column (not shown) or is mounted in other positions within the vehicle so as to engage a vehicle occupant in the event of a crash. The airbag cover 42 has a tear seam 44 through which the airbag 24 deploys. A tear seam sensor 46 is positioned across the tear seam 44 to indicate the moment in time when the airbag ruptures the tear seam 44. This indication is communicated by a line 45 to the airbag deployment controller 40 which uses the information received from the airbag deployment rate sensors 34 to determine if the airbag 24 has impacted an object, or an "out of position" vehicle occupant.

As indicated in FIG. 1 the folded airbag 24 may be positioned a short distance from the airbag cover 42. Further, the airbag cover 42 presents some resistance to the inflating airbag 24. The airbag deployment controller may receive a signal from the airbag crash controller indicating that the airbag igniter 28 has been fired. However the time required between the airbag igniter fire signal and the time the airbag breaches the tear seam 44 can be variable. Such variability may be caused by temperature extremes, which are normally considered to vary between −40° C. and +85° C. Another source of a signal that could be used to indicate airbag deployment has begun, is the output from the airbag deployment rate sensors 34. Again, the precision of this signal may be subject to variability, because of noise and vibration, and the irregular movement of the airbag 24 when inflation first begins.

Figure 2:
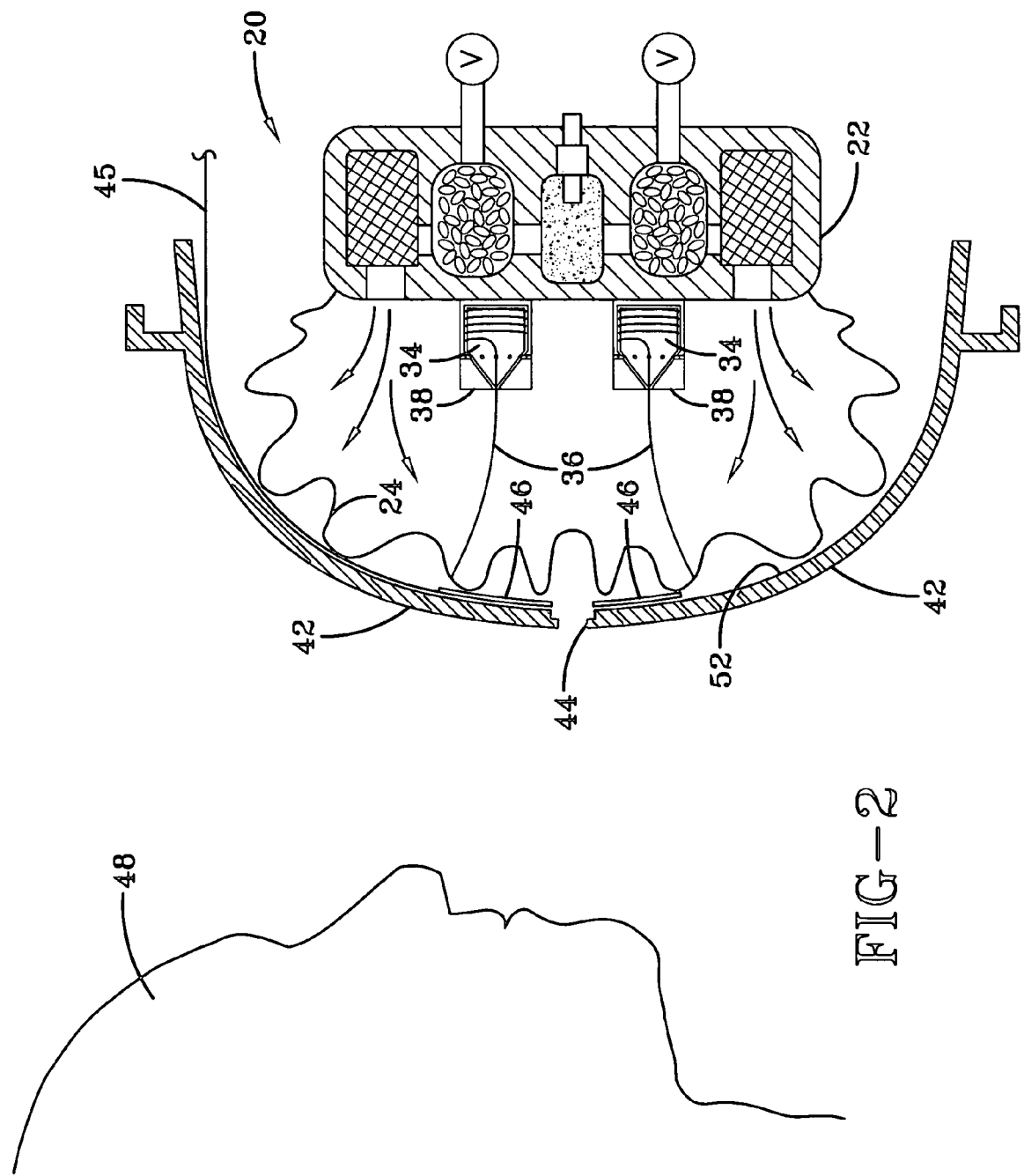
FIG. 2 is a schematic cross-sectional view of the airbag module, airbag cover, and airbag tear seam sensor of FIG. 1 showing the airbag partly deployed in juxtaposition to an "out of position" vehicle occupant.

If a vehicle occupant 48 is "out of position" as shown in FIG. 2, without a positive indicator from a tear seam sensor 46, it may be difficult to distinguish between the airbag passing through the cover 42 and the airbag impacting an "out of position" vehicle occupant such as the vehicle occupant 48 shown in FIG. 2. The tear seam sensor 46 provides a specific and positive datum that can be used by the airbag deployment controller 40 to mark the beginning of deployment. Thus the tear seam sensor 46 will add to the reliability and functionality with which the airbag deployment rate sensors 34 can be used to monitor deployment and possibly vent the airbag 24 of the airbag module 20.

Figure 4:
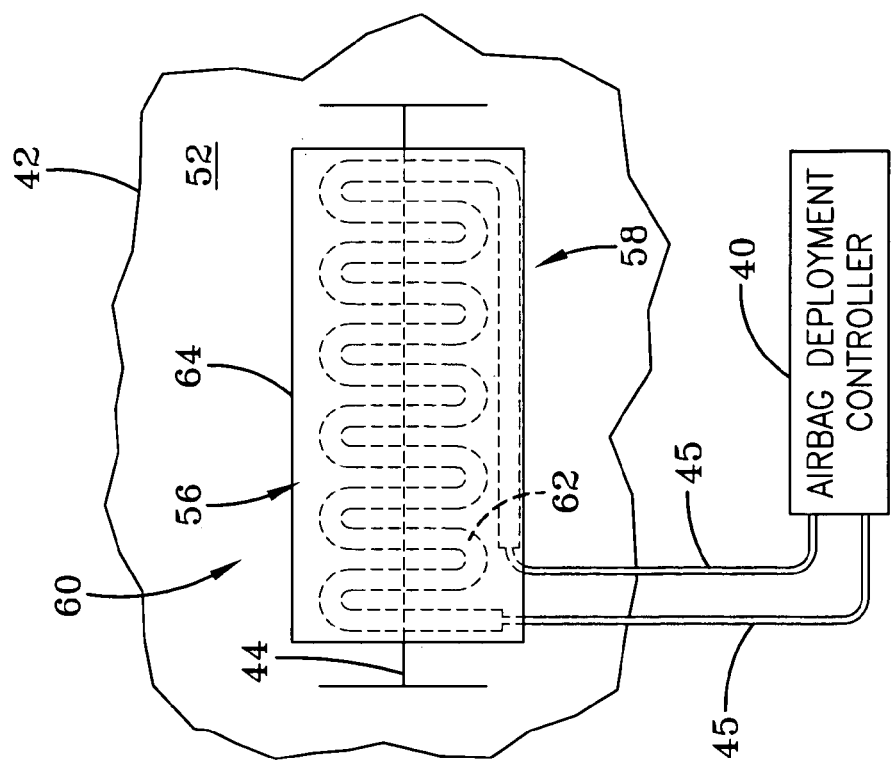
FIG. 4 is a schematic front elevational view of an alternative embodiment of the inside of the airbag cover, airbag tear seam and airbag tear seam sensor of FIG. 1.
Figure 3:
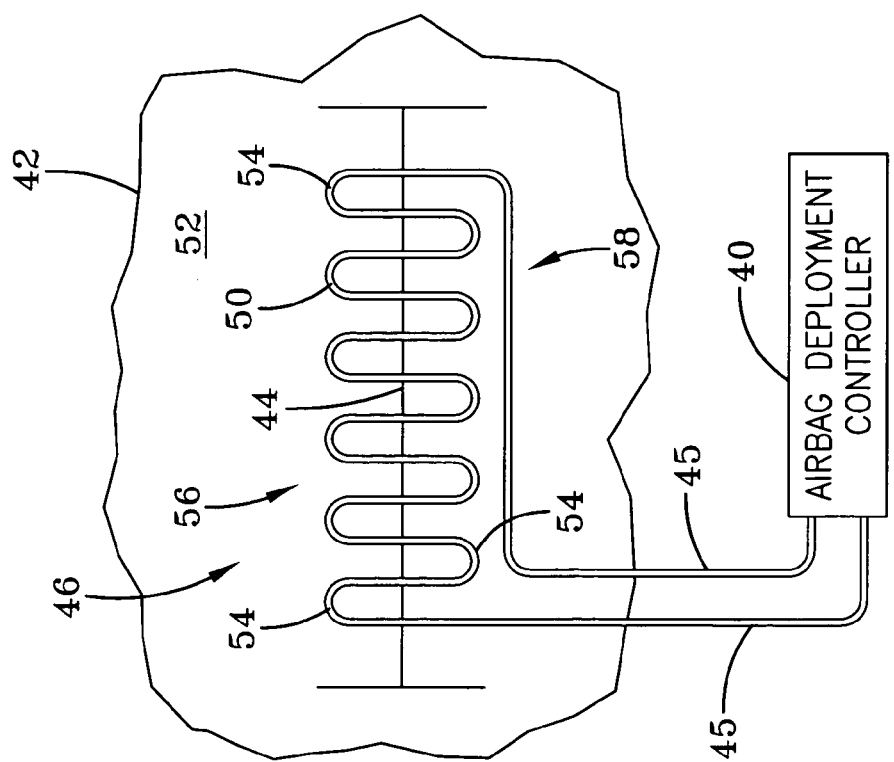
FIG. 3 is a schematic front elevational view of the inside of the airbag cover, airbag tear seam, and airbag tear seam sensor of FIG. 1.

The tear seam sensor 46, as shown in FIG. 3, is a wire 50 that is attached on the inside surface 52 of the airbag cover 42. The wire 50 passes multiple times across the tear seam 44, and portions 54 of the wire are attached or bonded to a first side 56 and second side 58 of the tear seam 44. When the cover is ruptured and the tear seam 44 is opened by the bursting forth of the airbag, the wire 50, which is connected to opposite sides of the tear seam, is severed, creating an open circuit which is detected by the airbag deployment controller 40. The wire 50 may alternatively be an optical fiber, or a wave guide. An alternative embodiment tear seam sensor 60 is shown in FIG. 4 and employs a foil 62. The foil 62 may be formed on a tape 64 or other substrate that is bonded to the first side 56 and across the tear seam 44 to the second side 58 of the tear seam.

It should be understood that the word tape when referring to the airbag deployment rate sensors is understood to include cloth tape, film tape, metal tape, string, wire, or other lightweight elongated structure which by being drawn past a sensor can detect the rate at which an airbag is deploying.

It should be understood that the wire, optical fiber, or foil forming the tear seam sensor 46, 60 may be mounted on a surface of the airbag cover, or may be molded or bonded within the airbag cover or between various layers making up the airbag cover. The wire, optical fiber, or foil is intended to be broken by the opening of the tear seam 44. Other types of switches could also be used so long as the switch meets the requirement of providing a clear signal indicating the tear seam has opened.

It should be understood that an inflator may employ either a solid gas generant or compressed gas. It should also be understood that the tear seam may be a straight line, a curved line, I-shaped, H-shaped, or any other shape or configuration. The tear seam need not actually tear; the nomenclature tear seam is meant to include any structure that opens to admit an airbag into the passenger compartment.

It should be understood that structures which are used to complete an electrical circuit, for the purposes of honking a vehicle horn are sometimes placed on the inside surface of the airbag cover and are designed to break when the airbag deploys and the tear seam is broken. However, the structures are not used in combination with an airbag deployment rate sensor employing a tape. More particularly, such horn switches do not provide information to an electronic system that is in controlling relation to an inflator vent.

It should be understood that a sensor such as sensor 46, 60 which is positioned with respect to the tear seam to detect when the tear seam is opened as the airbag is inflated by gas from the inflator could be used without a tape sensor and could be used to perform functions other than venting. For example, the deployment of the second of two stages in an airbag could be based on the timing of the tear seam opening.

It is understood that the invention is not limited to the particular construction and arrangement of parts herein illustrated and described, but embraces all such modified forms thereof as come within the scope of the following claims.

We claim:

1. A vehicle safety system comprising:
    an airbag in gas receiving relation to an inflator module;
    portions of an airbag cover forming a tear seam, the tear seam positioned so that the airbag passes through the tear seam as the airbag is inflated;
    a sensor positioned with respect to the tear seam to detect when the tear seam is opened as the airbag is inflated by gas from the inflator; and
    an electronic system in signal receiving relation to the sensor, and in controlling relation to a function of the air bag.

2. The vehicle safety system of claim 1 wherein the tear seam sensor comprises a wire extending in part across the tear seam at least once so that when the tear seam is opened the wire is broken and an open circuit is formed.

3. The vehicle safety system of claim 1 wherein the tear seam sensor comprises an optical fiber forming an optical path which extends across the tear seam at least once so that when the tear seam is opened an open optical circuit is formed.

4. The vehicle safety system of claim 1 wherein the tear seam sensor comprises a metal foil forming a closed circuit which extends across the tear seam at least once so that when the tear seam is opened an open circuit is formed.

5. A vehicle safety system comprising:
    an airbag in gas receiving relation to an inflator module;
    at least one airbag deployment rate sensor;
    portions of an airbag cover forming a tear seam, the tear seam positioned so that the airbag passes through the tear seam as the airbag is inflated;

a sensor positioned with respect to the tear seam to detect when the tear seam is opened as the airbag is inflated by gas from the inflator;

a vent that can be actuated to permit the escape of gas from the inflator module to terminate airbag inflation; and an electronic system in signal receiving relation to the at least one airbag deployment rate sensor, and in signal receiving relation to the tear seam sensor, and in controlling relation to the vent.

6. The vehicle safety system of claim 5 wherein the tear seam sensor comprises a wire extending in part across the tear seam at least once so that when the tear seam is opened the wire is broken and an open circuit is formed.

7. The vehicle safety system of claim 5 wherein the tear seam sensor comprises an optical fiber forming an optical path which extends across the tear seam at least once so that when the tear seam is opened an open optical circuit is formed.

8. The vehicle safety system of claim 5 wherein the tear seam sensor comprises a metal foil forming a closed circuit which extends across the tear seam at least once so that when the tear seam is opened an open circuit is formed.

9. A vehicle safety system comprising:

an inflator module;

an airbag in gas receiving relation to the inflator module;

at least one airbag deployment rate sensor having a tape which is attached to the airbag, so that tape is withdrawn from a cartridge fixedly mounted with respect to the inflator module as the airbag is inflated by gas from the inflator module;

an airbag cover, portions of the airbag cover forming a tear seam, the airbag cover positioned so that the airbag will pass through the tear seam as the airbag is inflated;

a tear seam sensor positioned with respect to the tear seam to detect when an opening is created at the tear seam by the airbag when inflated by gas;

an inflator vent, mounted to the inflator module for venting gas from the inflator module; and an electronic system in signal receiving relation to the at least one airbag deployment rate sensor, and in signal receiving relation to the tear seam sensor, and in controlling relation to the inflator vent.

10. The vehicle safety system of claim 9 wherein the tear seam sensor comprises a wire extending across the tear seam at least once so that when the tear seam is opened the wire is broken and an open circuit is formed.

11. The vehicle safety system of claim 9 wherein the tear seam sensor comprises an optical fiber forming an optical path which extends across the tear seam at least once so that when the tear seam is opened an open optical circuit is formed.

12. The vehicle safety system of claim 9 wherein the tear seam sensor comprises a metal foil forming a closed circuit, the metal foil being mounted to the airbag cover and extending across the tear seam at least once so that when the tear seam is opened an open circuit is formed.

13. A method of deploying an airbag comprising:

initiating an inflator module;

filling an airbag with gas received from the inflator module;

opening a tear seam to create an opening in a cover positioned in front of the airbag;

detecting the opening of the tear seam with a sensor, the sensor positioned with respect to the tear seam to detect the creation of the opening; and controlling a vent that can be actuated to permit the escape of gas from the inflator module upon detection of the condition that the opening of the tear seam has been detected.

14. The method of claim 13 wherein the step of detecting the opening of the tear seam with a sensor comprises detecting an open circuit when a wire acting as the sensor and extending across the tear seam is broken.

15. The method of claim 13 wherein the step of detecting the opening of the tear seam with a sensor comprises detecting an open optical circuit when an optical fiber acting as the sensor and extending across the tear seam is broken.

16. The method of claim 13 wherein the step of detecting the opening of the tear seam with a sensor comprises detecting an open circuit when a metal foil acting as the sensor and extending across the tear seam is broken.

17. A method of deploying an airbag comprising:

initiating an inflator module;

filling an airbag with gas received from the inflator module;

opening a tear seam to create an opening in a cover positioned in front of the airbag;

detecting the opening of the tear seam with a sensor, the sensor positioned with respect to the tear seam to detect the creation of the opening;

after detecting the opening of the tear seam, monitoring airbag deployment rate with at least one airbag deployment rate sensor having a tape which is attached to the airbag, so that tape is withdrawn from a cartridge fixedly mounted with respect to the inflator module as the airbag is inflated by gas from the inflator module; and opening a vent to vent the inflator module on the condition that the opening of the tear seam has been detected, and the airbag deployment rate decreases indicating the airbag has prematurely engaged an object.

18. The method of claim 17 wherein the step of detecting the opening of the tear seam with a sensor comprises detecting an open circuit when a wire acting as the sensor and extending across the tear seam is broken.

19. The method of claim 17 wherein the step of detecting the opening of the tear seam with a sensor comprises detecting an open optical circuit when an optical fiber acting as the sensor and extending across the tear seam is broken.

20. The method of claim 17 wherein the step of detecting the opening of the tear seam with a sensor comprises detecting an open circuit when a metal foil acting as the sensor and extending across the tear seam is broken.

21. A vehicle safety system comprising:

an inflator module;

an airbag in gas receiving relation to the inflator module;

at least one airbag deployment rate sensor having a tape which is attached to the airbag, so that tape is withdrawn from a cartridge fixedly mounted with respect to the inflator module as the airbag is inflated by gas from the inflator module;

an airbag cover, portions of the airbag cover forming a rupturable tear seam, the airbag cover positioned so that the airbag will rupture and pass through the tear seam as the airbag is inflated;

a tear seam sensor positioned with respect to the tear seam to detect the rupture of the tear seam;

a vent for venting gas from the inflator module; and an electronic system in signal receiving relation to the at least one airbag deployment rate sensor, and in signal receiving relation to the tear seam sensor, and in controlling relation to the inflator vent.

22. The vehicle safety system of claim 21 wherein the tear seam sensor comprises a wire extending across the tear seam at least once so that when the tear seam is opened the wire is broken and an open circuit is formed.

23. The vehicle safety system of claim 21 wherein the tear seam sensor comprises an optical fiber forming an optical path which extends across the tear seam at least once so that when the tear seam is opened an open optical circuit is formed.

24. The vehicle safety system of claim 21 wherein the tear seam sensor comprises a metal foil forming a closed circuit, the metal foil being mounted to the airbag cover and extending across the tear seam at least once so that when the tear seam is opened an open circuit is formed.

\* \* \* \* \*